US011933256B1

(12) United States Patent
Rundell et al.

(10) Patent No.: US 11,933,256 B1
(45) Date of Patent: Mar. 19, 2024

(54) INTAKE MANIFOLD COVER CONFIGURED FOR FLUID DISTRIBUTION AND CAPTURE OF INSULATOR

(71) Applicant: GM GLOBAL TECHNOLOGY OPERATIONS LLC, Detroit, MI (US)

(72) Inventors: Drake Rundell, Auburn Hills, MI (US); Christopher K. Clarke, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/965,123

(22) Filed: Oct. 13, 2022

(51) Int. Cl.
*F02M 5/12* (2006.01)
*F02M 35/104* (2006.01)
*F02M 35/12* (2006.01)

(52) U.S. Cl.
CPC ...... *F02M 35/1272* (2013.01); *F02M 35/104* (2013.01)

(58) Field of Classification Search
CPC ... F02M 35/1272; F02M 35/104; F02M 35/10
See application file for complete search history.

(56) References Cited

U.S. PATENT DOCUMENTS

| | | | | | |
|---|---|---|---|---|---|
| 6,494,174 | B1 * | 12/2002 | Daly | F02B 75/22 | 123/184.61 |
| 2004/0181003 | A1 * | 9/2004 | Murakami | C08J 9/42 | 524/487 |
| 2005/0005890 | A1 * | 1/2005 | Asfaw | F02M 35/112 | 123/184.61 |
| 2006/0016416 | A1 * | 1/2006 | Kim | F02M 35/10072 | 123/184.61 |
| 2007/0215264 | A1 * | 9/2007 | Ueno | B60R 13/08 | 156/73.6 |
| 2011/0253080 | A1 * | 10/2011 | Newman | F02M 35/10321 | 123/184.21 |
| 2013/0032114 | A1 * | 2/2013 | Marimbordes | F02M 35/10255 | 123/184.47 |

OTHER PUBLICATIONS

U.S. Appl. No. 17/895,157, filed Aug. 25, 2022, Rundell et al.

* cited by examiner

*Primary Examiner* — Syed O Hasan

(57) ABSTRACT

An intake system for an engine includes: an intake manifold including a plurality of ports; a cover mounted to the intake manifold over the plurality of ports; a fluid distribution track defined by the cover, the fluid distribution track including a plurality of openings in fluid communication with an interior of the intake manifold by way of the plurality of ports of the intake manifold; and a dampening material between the cover and the intake manifold, the dampening material configured to dampen at least one of noise, vibration, and harshness.

18 Claims, 5 Drawing Sheets

INTAKE MANIFOLD COVER CONFIGURED FOR FLUID DISTRIBUTION AND CAPTURE OF INSULATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to intake manifolds for an engine. Intake manifolds generally supply a fuel/air mixture to engine cylinders. The present disclosure includes an engine intake system having various advantages, as explained in detail herein.

SUMMARY

In a feature, an intake system for an engine includes: an intake manifold including a plurality of ports; a cover mounted to the intake manifold over the plurality of ports; a fluid distribution track defined by the cover, the fluid distribution track including a plurality of openings in fluid communication with an interior of the intake manifold by way of the plurality of ports of the intake manifold; and a dampening material between the cover and the intake manifold, the dampening material configured to dampen at least one of noise, vibration, and harshness.

In further features, the cover is vibration welded to the intake manifold.

In further features, the intake manifold includes a top shell with a plurality of columns extending outward from an outer surface of the top shell, the plurality of columns define the plurality of ports.

In further features, the cover is vibration welded to the plurality of columns of the top shell.

In further features, the plurality of ports of the intake manifold are vertically aligned with the plurality of openings of the fluid distribution track.

In further features, the intake manifold includes a plurality of runners configured to distribute fluid entering the intake manifold through the plurality of ports.

In further features, a cap is mounted over the fluid distribution track, and an air core is defined between the cap and the fluid distribution track.

In further features, the cap defines a fluid inlet and is vibration welded to the cover.

In further features, the fluid distribution track includes a passenger side configured to distribute fluid to the plurality of ports on a passenger side of the intake manifold, a driver side configured to distribute fluid to the plurality of ports on a driver side of the intake manifold, and a connector connecting the passenger side and the driver side.

In further features, the dampening material includes foam.

In further features, the intake manifold includes a top shell with a plurality of columns extending outward from an outer surface of the top shell, the plurality of columns define the plurality of ports, and the dampening material defines a plurality of apertures, each one of the plurality of apertures receives, and wraps around, one of the plurality of columns.

In further features, the cover is mounted to the intake manifold by vibration welding and without fasteners, and the dampening material is seated on the intake manifold and retained between the cover and the intake manifold without fasteners.

In a feature, an intake system for an engine includes: an intake manifold including a plurality of columns extending outward from an outer surface of the intake manifold, the plurality of columns defining a plurality of ports; a cover welded to the intake manifold by welds at an outer periphery of the cover; a fluid distribution track defined by the cover, the fluid distribution track including a plurality of openings in fluid communication with an interior of the intake manifold by way of the plurality of ports of the intake manifold; a cap mounted to the cover over the fluid distribution track, an air core is defined between the cap and the fluid distribution track; and a dampening foam between the cover and the intake manifold, the dampening foam configured to dampen at least one of noise, vibration, and harshness.

In further features, the cover is further welded to the intake manifold by welds between the cover and the plurality of columns.

In further features, the dampening foam defines a plurality of apertures, each one of the plurality of apertures receives, and wraps around, one of the plurality of columns.

In further features, the intake manifold includes runners configured to distribute fluid entering the intake manifold through the plurality of ports.

In further features, the dampening foam is between the runners.

In further features, the plurality of ports of the intake manifold are vertically aligned with the plurality of openings of the fluid distribution track.

In further features, an outer periphery of the cover is vibration welded to the intake manifold.

In a feature, an intake system for an engine includes: an intake manifold including a plurality of columns extending outward from an outer surface of the intake manifold, the plurality of columns defining a plurality of ports, an inner surface of the intake manifold includes runners configured to distribute fluid entering the intake manifold through the plurality of ports; a cover welded to the intake manifold by vibration welds at an outer periphery of the cover and between the cover and the plurality of columns; a fluid distribution track defined by the cover, the fluid distribution track including a plurality of openings in fluid communication with an interior of the intake manifold by way of the plurality of ports of the intake manifold, the plurality of ports are vertically aligned with the plurality of openings; a cap vibration welded to the cover over the fluid distribution track, an air core is defined between the cap and the fluid distribution track; and a dampening foam between the cover and the intake manifold that is configured to dampen at least one of noise, vibration, and harshness, the dampening foam defines a plurality of apertures, each one of the plurality of apertures receives, and wraps around, one of the plurality of columns.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
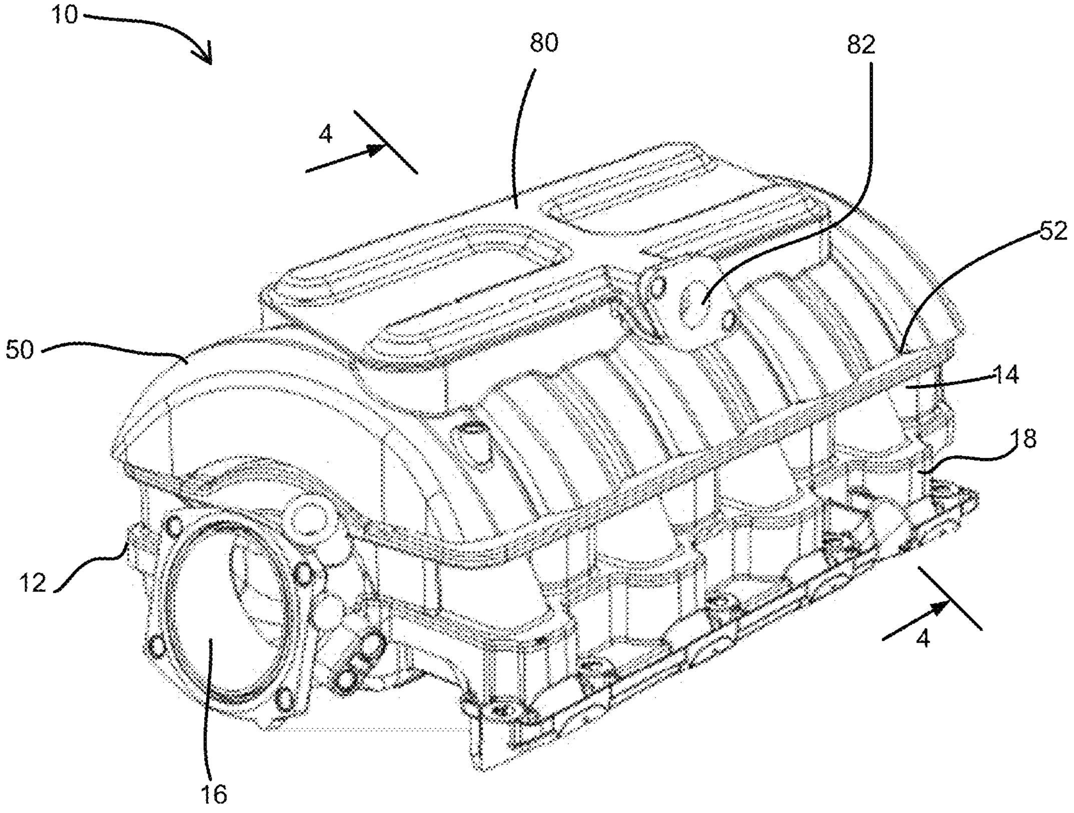
FIG. 1 is a perspective view of an exemplary intake system for an engine in accordance with the present disclosure.
Figure 2:
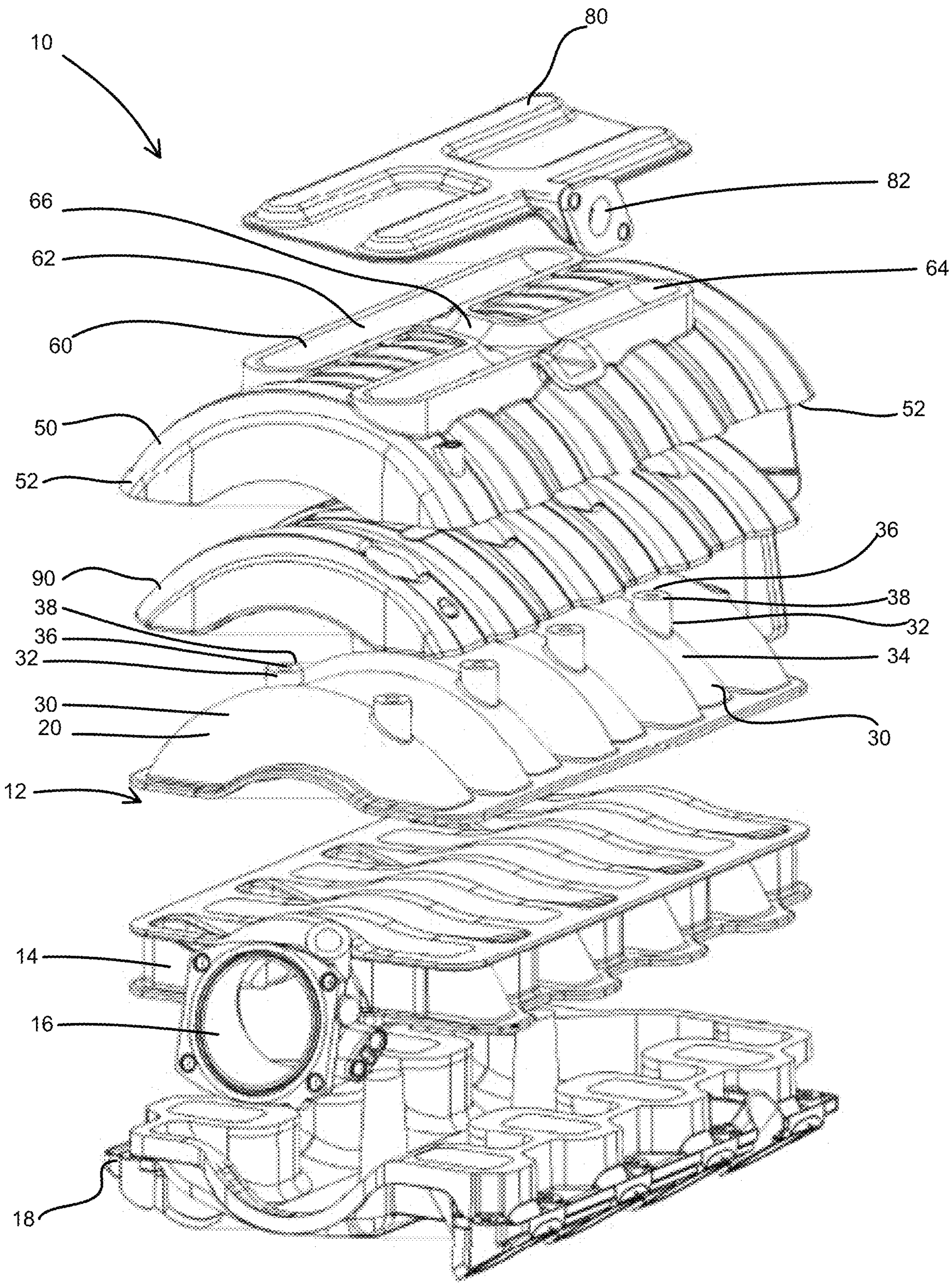
FIG. 2 is an exploded view of the intake system of FIG. 1.

With initial reference to FIGS. 1 and 2, an exemplary intake system 10 in accordance with the present disclosure is illustrated. The intake system 10 is generally configured to evenly distribute a fuel/air mixture and fluid to cylinders of an engine, and to suppress NVH (noise, vibration, and harshness) generated by the engine. The intake system 10 may be configured for use with any suitable vehicle engine, as well as any suitable non-vehicular engine. Further, the present disclosure is applicable to any application where dampening of NVH and/or fluid distribution is desirable, as explained further herein.

The intake system 10 generally includes an intake manifold 12, which has a body 14 defining a bore 16. The bore 16 may be a throttle body bore through which the air/fuel mixture enters the intake manifold 12. The body 14 is defined between a base 18 and a top shell 20 of the intake manifold 12. The body 14, the base 18, and the top shell 20 may each be made of any suitable material, such as any suitable nylon-glass composite material. The base 18 and the top shell 20 may be secured to the body 14 in any suitable manner, such as by vibration welding and/or laser welding. The base 18 is configured to be mounted to an engine block, or at any other suitable location where NVH dampening and/or fluid distribution is desired.

With particular reference to FIG. 2, for example, the top shell 20 includes a plurality of runners 30, which are generally a series of offset, curved surfaces configured to evenly distribute fluid throughout the intake manifold 12. A plurality of shell columns 32 extend from an upper surface 34 of the runners 30. The shell columns 32 define ports 36. The ports 36 extend through the shell columns 32 from a column top surface 38 to an interior of the intake manifold 12 (see FIG. 4, for example). Fluid entering the intake manifold 12 through the ports 36 flows along curved inner surfaces of the runners 30, which evenly distribute the fluid throughout the intake manifold 12 and ultimately to the engine. The intake system 10 is configured to evenly distribute any suitable fluid throughout the intake manifold 12, such as, but not limited to, one or more of the following: EGR (exhaust gas recirculation), PCV (positive crankcase ventilation gas), propane, natural gas, and nitrous.

The intake system 10 further includes a cover 50. The cover 50 has an outer periphery 52, which is mounted to any suitable portion of the top shell 20 of the intake manifold 12. The cover 50 is advantageously mounted to the top shell 20 without fasteners. For example, the cover 50 may be welded to the top shell 20, such as by vibration welding and/or laser welding. The cover 50 may be made of any suitable material, such as any suitable nylon-glass composite material.

Figure 3:
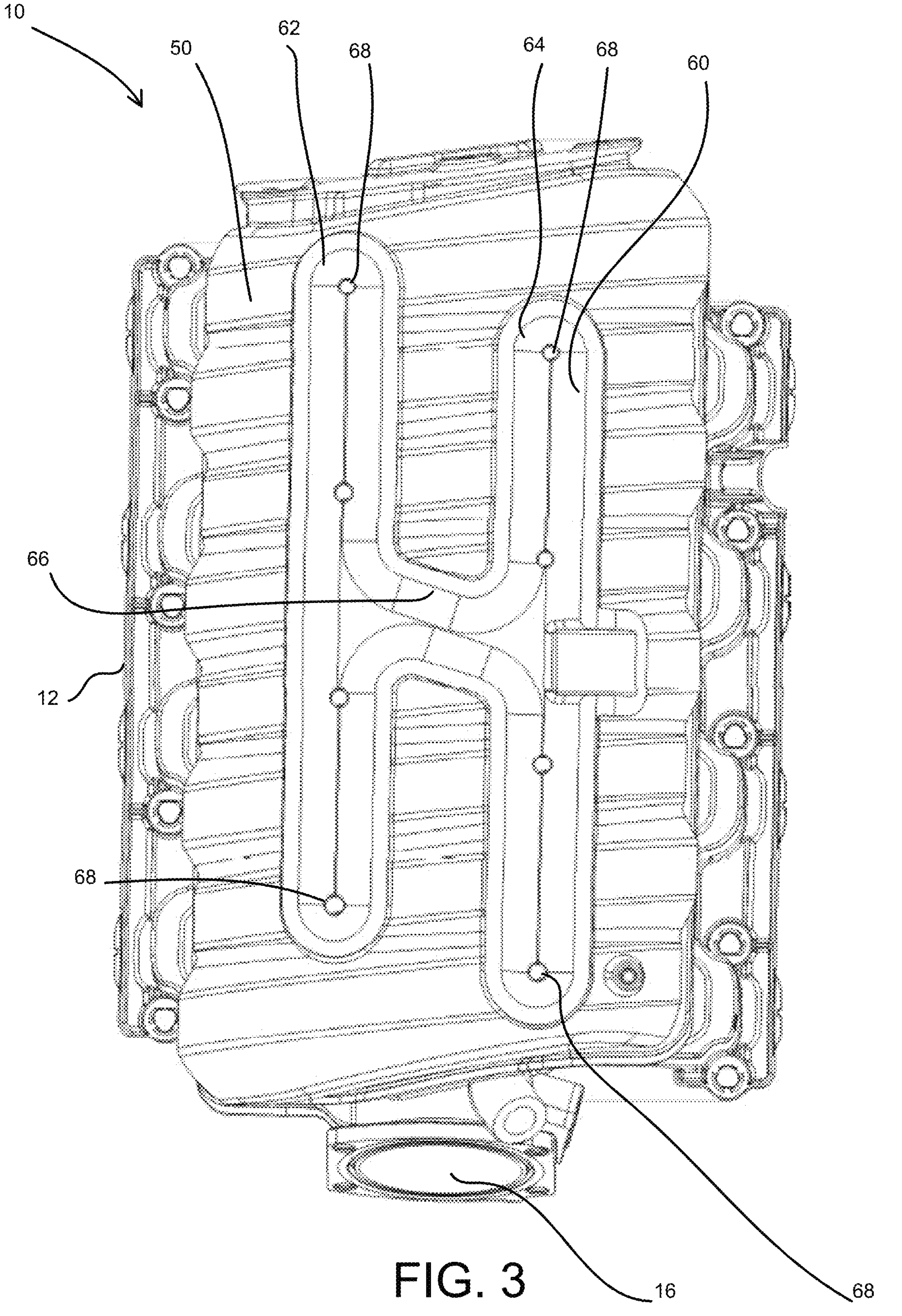
FIG. 3 is a top view of the intake system of FIG. 1 with a cap thereof removed.
Figure 4:
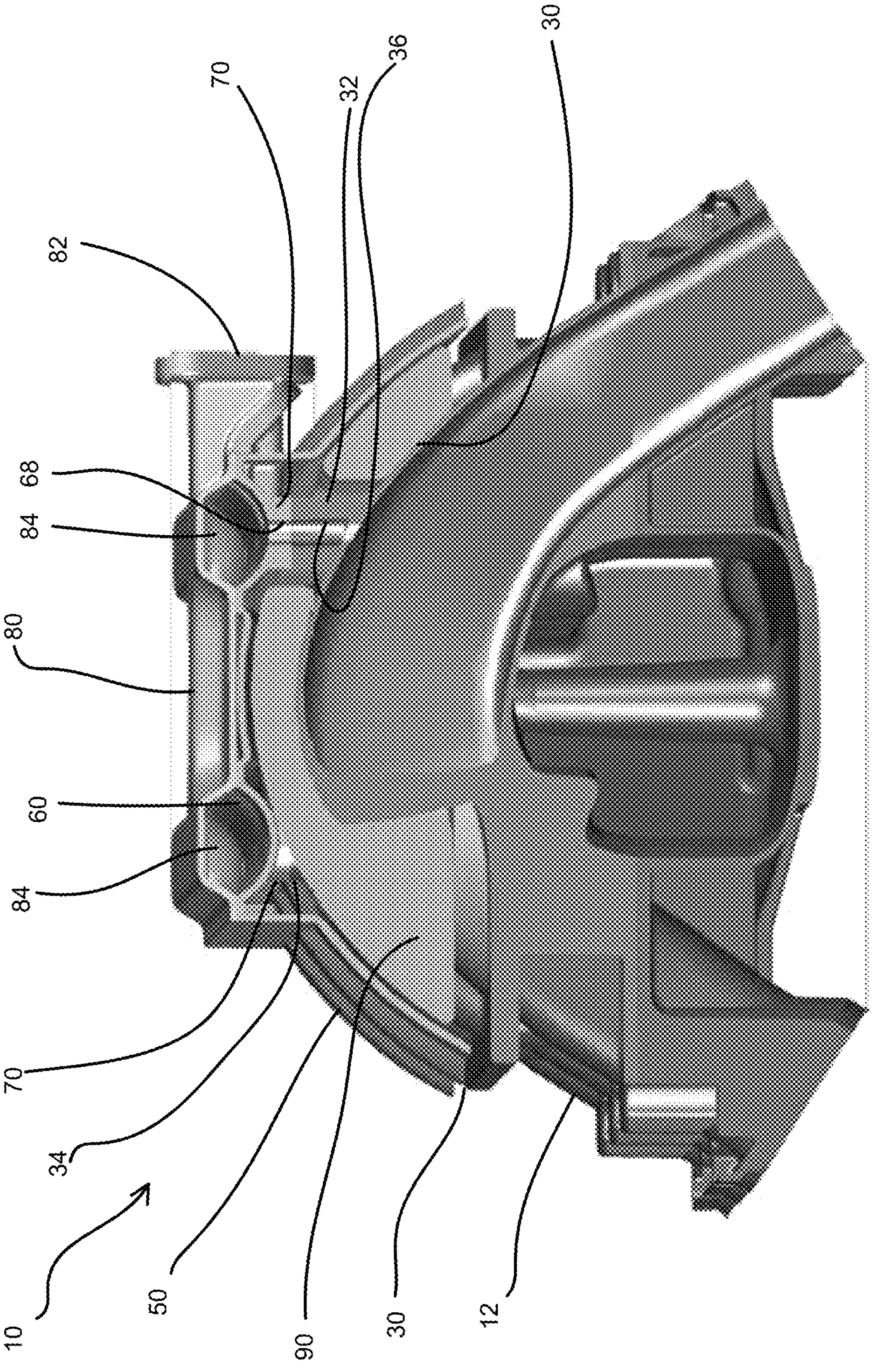
FIG. 4 is a cross-sectional view taken along line 4-4 of FIG. 1.

With continued reference to FIG. 2, and additional reference to FIG. 3, the cover 50 defines a fluid distribution track 60 at an outer surface thereof. The fluid distribution track 60 is configured to evenly distribute fluid to the ports 36 of the shell columns 32. The fluid distribution track 60 includes a passenger side 62, a driver side 64, and a connector 66, which connects the passenger side 62 and the driver side 64. The fluid distribution track 60 defines a plurality of openings 68 along the passenger side 62 and the driver side 64. The openings 68 extend through cover columns 70 at an inner surface of the cover 50, as illustrated in FIG. 4. The openings 68 are in fluid communication with an interior of the intake manifold 12 by way of the plurality of ports 36. More specifically, the cover 50 is seated on the top shell 20 such that the cover columns 70 are seated on the shell columns 32, and each one of the openings 68 is in fluid communication with a different one of the ports 36. In the example illustrated, the openings 68 are vertically aligned with the ports 36 (see FIG. 4). The cover columns 70 and the shell columns 32 are secured together in any suitable manner, such as by welding. Suitable welding techniques include vibration welding and laser welding. The cover columns 70 and the shell columns 32 are advantageously secured together without fasteners.

A cap 80 is mounted to the cover 50 over the fluid distribution track 60. The cap 80 may be made of any suitable material, such as any suitable nylon-glass composite material. The cap 80 may be mounted in any suitable manner, such as by welding, to provide an airtight seal. Suitable welding techniques include vibration welding and laser welding. The cap 80 may be styled to provide a visually-pleasing customer-facing surface.

The cap 80 defines a fluid inlet 82. Fluid may be introduced into the fluid distribution track 60 through the fluid inlet 82. The fluid inlet 82 may be included with the cap 80 as illustrated, or may be integrated into the cover 50. As illustrated in FIG. 4, air cores 84 are defined between the cap 80 and the fluid distribution track 60. From the fluid inlet 82, fluid flows into the air cores 84 and throughout the fluid distribution track 60, which evenly distributes the fluid to the openings 68. Fluid flows through the openings 68 and through the ports 36 of the shell columns 32 into the intake manifold 12. The runners 30 are configured to feed the fluid into the engine block. With reference to FIG. 4, for example, the runners 30 have a curved shape to advantageously direct the fluid across the inner surface of the top shell 20 down to the engine block.

Figure 5:
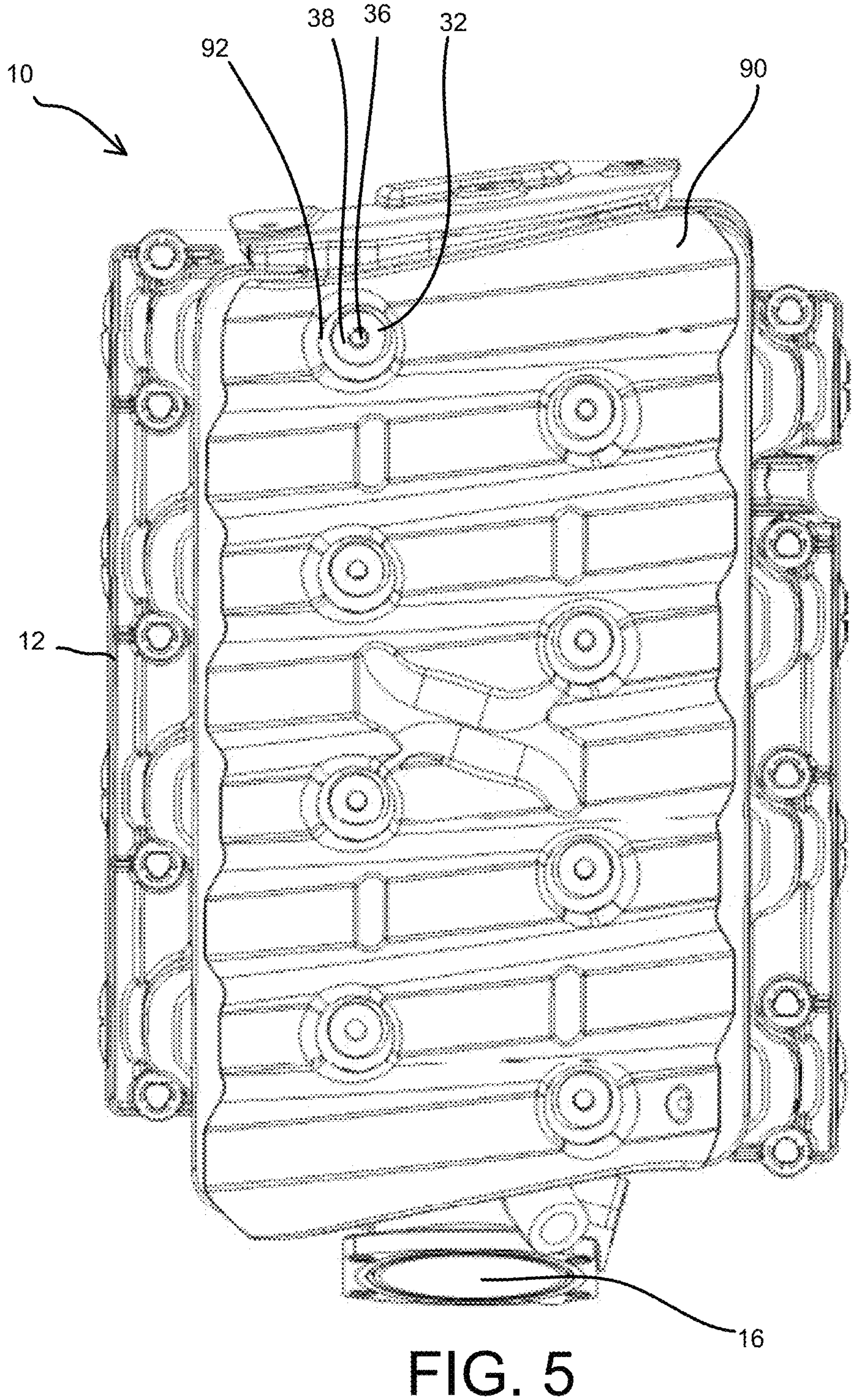
FIG. 5 is a top view of the intake system of FIG. 1 with the cap and a cover thereof removed.

As illustrated in FIGS. 2, 4, and 5, the intake system 10 further includes a dampening material 90 between the intake manifold 12 and the cover 50. The dampening material 90 may be any suitable material configured to reduce noise, vibration, and/or harshness (NVH) at the intake manifold 12, such as NVH generated by the engine to which the intake manifold 12 is mounted. The dampening material 90 may be made of foam, or any other suitable material. Exemplary dampening foam may include, for example, polyester, polyurethane, and/or blended synthetic fibers.

The dampening material 90 is seated on the top shell 20 of the intake manifold 12, and the cover 50 is mounted to the top shell 20 as described above to retain the dampening material 90 between the cover 50 and the top shell 20. Because the cover 50 is welded to the top shell 20, and no fasteners are used, there is no way for the dampening material 90 to escape from between the cover 50 and the top shell 20. The dampening material 90 does not need to be secured to either the top shell 20 or the cover 50, thus eliminating any need for an adhesive or other fastener, which saves manufacturing time and costs. The dampening material 90 may extend entirely across the top shell 20 or may be arranged at various discrete locations about the top shell 20. The dampening material 90 may be arranged between the runners 30, tight to the contours of the runners 30, to further dampen NVH.

With reference to FIG. 5, the dampening material 90 defines a plurality of apertures 92. Each one of the apertures 92 is configured to receive and wrap around one of the plurality of shell columns 32. The dampening material 90 thus fits tightly around the shell columns 32 to facilitate dampening of vibrations from the intake manifold 12 and the engine. The intake system 10 advantageously reduces NVH from the engine and the intake manifold 12, and also provides fluid distribution into the intake manifold, thereby eliminating any need for a separate fluid distribution assembly, which reduces overall packaging size, material costs, and manufacturing costs.

Although the cover 50 is described as being welded to the intake manifold 12 to hold the dampening material 90 against the intake manifold 12, the cover 50 may be welded to any other suitable component in need of NVH dampening. For example, the cover 50 may be welded to an air induction box to retain the dampening material 90 against the air induction box to dampen NVH at the air induction box.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An intake system for an engine, the intake system comprising: an intake manifold including a plurality of ports; a cover mounted to the intake manifold over the plurality of ports; a fluid distribution track defined by the cover, the fluid distribution track including a plurality of openings in fluid communication with an interior of the intake manifold by way of the plurality of ports of the intake manifold; a cap mounted over the fluid distribution track; wherein an air core is defined between the cap and the fluid distribution track; and a dampening material between the cover and the intake manifold, the dampening material is configured to dampen at least one of noise, vibration, and harshness.

2. The intake system of claim 1, wherein the cover is vibration welded to the intake manifold.

3. The intake system of claim 1, wherein the intake manifold includes a top shell with a plurality of columns extending outward from an outer surface of the top shell, the plurality of columns define the plurality of ports.

4. The intake system of claim 3, wherein the cover is vibration welded to the plurality of columns of the top shell.

5. The intake system of claim 1, wherein the plurality of ports of the intake manifold are vertically aligned with the plurality of openings of the fluid distribution track.

6. The intake system of claim 1, wherein the intake manifold includes a plurality of runners configured to distribute fluid entering the intake manifold through the plurality of ports.

7. The intake system of claim 1, wherein the cap defines a fluid inlet and is vibration welded to the cover.

8. The intake system of claim 1, wherein the fluid distribution track includes a passenger side configured to distribute fluid to the plurality of ports on a passenger side of the intake manifold, a driver side configured to distribute fluid to the plurality of ports on a driver side of the intake manifold, and a connector connecting the passenger side and the driver side.

9. The intake system of claim 1, wherein the dampening material includes foam.

10. The intake system of claim 1, wherein:

the intake manifold includes a top shell with a plurality of columns extending outward from an outer surface of the top shell, the plurality of columns define the plurality of ports; and the dampening material defines a plurality of apertures, each one of the plurality of apertures receives, and wraps around, one of the plurality of columns.

11. The intake system of claim 1, wherein:

the cover is mounted to the intake manifold by vibration welding and without fasteners; and the dampening material is seated on the intake manifold and retained between the cover and the intake manifold without fasteners.

12. An intake system for an engine, the intake system comprising:

an intake manifold including a plurality of columns extending outward from an outer surface of the intake manifold, the plurality of columns defining a plurality of ports;

a cover welded to the intake manifold by welds at an outer periphery of the cover;

a fluid distribution track defined at an exterior of the cover, the fluid distribution track including a plurality of openings in fluid communication with an interior of the intake manifold by way of the plurality of ports of the intake manifold, the plurality of ports of the intake manifold are vertically aligned with the plurality of openings of the fluid distribution track;

a cap mounted to the cover over the fluid distribution track, an air core is defined between the cap and the fluid distribution track; and a dampening foam between the cover and the intake manifold, the dampening foam configured to dampen at least one of noise, vibration, and harshness.

13. The intake system of claim 12, wherein the cover is further welded to the intake manifold by welds between the cover and the plurality of columns.

14. The intake system of claim 12, wherein the dampening foam defines a plurality of apertures, each one of the plurality of apertures receives, and wraps around, one of the plurality of columns.

15. The intake system of claim 12, wherein the intake manifold includes runners configured to distribute fluid entering the intake manifold through the plurality of ports.

16. The intake system of claim 15, wherein the dampening foam is between the runners.

17. The intake system of claim 12, wherein an outer periphery of the cover is vibration welded to the intake manifold.

18. An intake system for an engine, the intake system comprising:

an intake manifold including a plurality of columns extending outward from an outer surface of the intake manifold, the plurality of columns defining a plurality of ports, an inner surface of the intake manifold includes runners configured to distribute fluid entering the intake manifold through the plurality of ports;

a cover welded to the intake manifold by vibration welds at an outer periphery of the cover and between the cover and the plurality of columns;

a fluid distribution track defined by the cover, the fluid distribution track including a plurality of openings in fluid communication with an interior of the intake manifold by way of the plurality of ports of the intake manifold, the plurality of ports are vertically aligned with the plurality of openings;

a cap vibration welded to the cover over the fluid distribution track, an air core is defined between the cap and the fluid distribution track; and a dampening foam between the cover and the intake manifold, the dampening foam is configured to dampen at least one of noise, vibration, and harshness, the dampening foam defines a plurality of apertures, each one of the plurality of apertures receives, and wraps around, one of the plurality of columns.

* * * * *